(No Model.)

E. BUSSELL.
TOOL FOR TURNING OR PLANING METAL.

No. 429,883. Patented June 10, 1890.

Witnesses:
J. Staib
Chas H. Smith

Inventor:
Edward Bussell
per Lemuel W. Serrell Atty.

UNITED STATES PATENT OFFICE.

EDWARD BUSSELL, OF NEW YORK, N. Y., ASSIGNOR TO HIMSELF, AND SAMUEL W. REESE, OF WESTFIELD, NEW JERSEY.

TOOL FOR TURNING OR PLANING METAL.

SPECIFICATION forming part of Letters Patent No. 429,883, dated June 10, 1890.

Application filed October 31, 1889. Serial No. 328,811. (No model.)

*To all whom it may concern:*

Be it known that I, EDWARD BUSSELL, a subject of the Queen of Great Britain, residing in the city and State of New York, have invented an Improvement in Tools for Turning and Planing Metal, of which the following is a specification.

Holders for tools have been made of a metal bar with an eye at the end, the hole of the eye being tapering, and a chuck to clamp a tool has been received into such tapering eye. The tool, however, is not firm and is liable to spring or to become displaced by the pressure against the cutting end.

My invention relates to the combination, with the tool-holder having a tapering eye, of a tool made with a tapering shank to fit the eye, and the end and side ground off to form the cutting-edge.

This tool can be turned around in the eye to bring the cutting-edge into the desired position to the stock or bar, and the tapering shank holds the cutting-edge very firmly; but the tool can be easily separated from the holder and turned around into the desired position or another tool inserted in place of an injured or dull tool.

Figure 1:
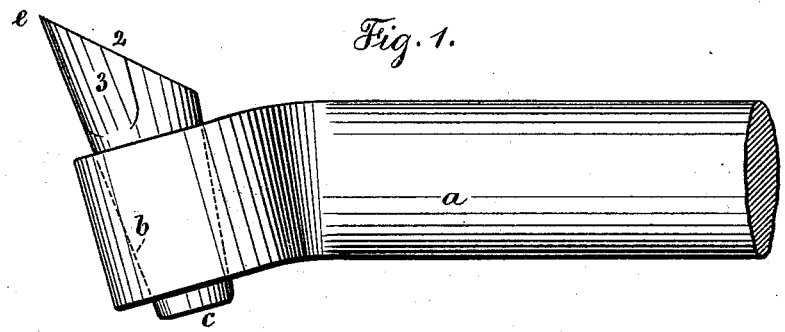
Figure 2:
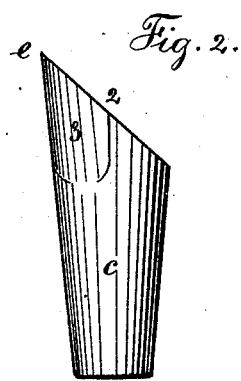
Figure 3:
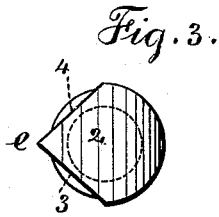

In the drawings, Figure 1 is an elevation of the tool and holder. Fig. 2 is a detached view of the tool, and Fig. 3 is an end view of the same.

The holder is made of a bar $a$, with an eye $b$ at one end, the interior of such eye being tapering to receive the tapering shank $c$ of the tool, which shank is preferably a regular circular taper, but may be prismatic, with numerous faces.

At the end of the tool-shank $c$ is the cutting-edge $e$, the same being formed of the beveled or inclined face 2 and the side faces 3 4, preferably ground to form the sharp cutting-edge adapted to turning or planing metal. The shank $c$ wedges tightly into the eye, but can be easily separated by the tap of a hammer on the smaller end and turned around into any desired position relatively to the bar or stock.

I claim as my invention—

The combination, with the holder having a tapering eye at the end, of the tool having a tapering shank fitting the eye and the cutting-edge at the end, substantially as set forth.

Signed by me this 28th day of October, 1889.

EDWARD BUSSELL.

Witnesses:
GEO. T. PINCKNEY,
WILLIAM G. MOTT.